Oct. 11, 1966    R. M. EISENBERG ETAL    3,278,670
RADAR ANTENNA BEAM SIMULATOR
Filed April 16, 1964    2 Sheets-Sheet 1

INVENTORS
ROBERT M. EISENBERG
WILLIAM P. JAMESON
BY

INVENTORS
ROBERT M. EISENBERG
WILLIAM P. JAMESON

United States Patent Office 3,278,670
Patented Oct. 11, 1966

3,278,670
RADAR ANTENNA BEAM SIMULATOR
Robert M. Eisenberg, Rockville, and William P. Jameson, Silver Spring, Md., assignors, by mesne assignments, to General Precision, Inc., Binghamton, N.Y., a corporation of Delaware
Filed Apr. 16, 1964, Ser. No. 360,187
2 Claims. (Cl. 35—10.4)

This invention relates to simulation of radar presentations and more particularly to equipment for the simulation of the radar presentation that would be obtained on a pilot's indicator in an airborne land mass radar system.

In the so-called land mass radar, the radar antenna-reflector combination is carried in a radome underneath the aircraft. The antenna is pointed in a forward and downward direction and scans in azimuth to obtain a wide angled view of the approaching terrain underneath the aircraft. The antenna is also tiltable in elevation through a convenient range at the pilot's direction so that he may improve the presentation on the radar scope when altitude or aircraft speed is changed.

In order to assist a student pilot in flying general low altitude missions where the pilot must react quickly to sudden changes in terrain, or to train him to fly particular missions where he must recognize particular terrain features, it is desirable to train the student in interpreting the radar presentation of the terrain or targets immediately ahead of him and making the proper responses to the student controls of the simulated aircraft and radar system. His reactions can then be scored by an instructor. For this purpose the so-called radar return generator is used which generates a video signal corresponding to the radar return from a particular target area. The video return, of course, is dependent upon the reflectivity of the target, the characteristics of the antenna being simulated, the simulated altitude of the aircraft, and the antenna orientation. The antenna can be operated in two modes either by using the normal pencil beam power pattern shown in FIGURE 1A for precise searching or by actuating the so-called spoilers in the reflector surface to produce the spoiled beam power pattern used in broad searching over a greater area as shown in FIGURE 1B.

In simulating the radar return of this type of airborne search radar system, the target information is stored in some convenient form, and a suitable light sensitive device picks up the light variations from the storage medium, and the output of this device furnishes the pulse echoes used to generate the proper picture. The simulated pilot's indicator, such as shown in FIGURE 3C, which gives the radar picture of the oncoming terrain will show echoes between the intercept of the leading and trailing edges of the simulated antenna beam with the stored information of the simulated target from the radar return generator.

At present the pencil beam pattern is simulated by a system producing an on-off gating pulse, as shown in FIGURE 2, which modulates the output of the radar return generator. The criteria for the positioning of the leading and trailing edges of this gate as a function of antenna tilt and altitude is derived from the beam width of the antenna pattern half power points. From this the leading edge and lagging edge cut off points of the beam on the earth's surface can be determined through simple trigonometric computation, and the radar return generator furnishes the proper video presentation. This system is unrealistic so far as the pencil beam mode is concerned in that it is assumed that the power pattern goes from a uniform gain to zero at the half power points, which is not the case. As a result the well defined leading and trailing edges of the beam on the radar display, shown in FIGURE 3C, presents an erroneous picture.

Furthermore, the spoiled beam presentation produced in the same manner is also unrealistic. The spoiled beam has holes in the energy pattern caused partly by the radome and partly by the spoilers in the antenna reflector. In addition, the leading and trailing edges are not well defined because the power in the beam gradually tapers off to zero.

The present invention is an improvement over the older system of simulation in that it produces a realistic simulation of the actual radar presentation by taking into account the gradual variance in gain across the antenna pattern and the discontinuities in the spoiled antenna beam overlooked in the old method. The general method described can also be used for obtaining a proportional gate without having the modulating waveform appear as part of the output signal.

It is accordingly a general object of this invention to provide a device for obtaining a proportional gate without having the modulating waveform appear as a part of the output signal.

It is a more particular object of this invention to provide improved equipment for simulating the radar presentation from an airborne search radar system.

It is a further object to provide improved equipment for simulating the radiated energy from a radar antenna beam.

It is a still further object to provide improved equipment for simulating the holes in a radar antenna beam.

It is an additional object to provide improved equipment for simulating the radar presentation from an airborne search radar system in which the representation of the intercepts of the beam with the target makes allowances for the power distribution within the confines of the beam.

It is a feature of this invention that with a minimum of conventional electronic equipment and an inexpensive mask it provides a precise simulation of the actual characteristics that would be present in an actual radar representation of an airborne search radar system.

These and additional objects and features will become more fully appreciated after referring to the accompanying drawings and description in which.

Figure 1A:
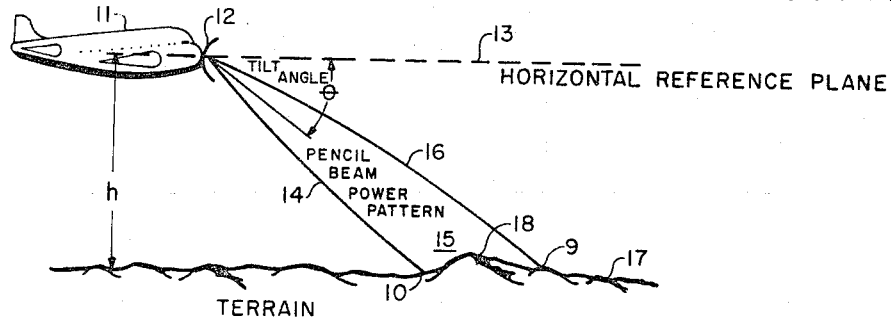
FIGURE 1A is an elevation view of an aircraft flying with the pencil beam of its radar antenna directed toward the ground.

Referring to FIGURE 1A, an aircraft 11 is shown flying a mission at altitude $h$ with its radar antenna 12 tilted down from the horizontal reference plane 13 at some convenient angle $\theta$. The radar antenna-reflector combination is operating in its pencil beam mode and radiates a pencil beam of energy 15 down towards the terrain 17 (the target) below. The portion of the terrain which reflects energy back toward the antenna-reflector combination 12 is that which lies between the leading edge 16 and the trailing edge 14 of pencil beam 15. The word antenna will be used herein to describe the antenna-reflector combination. The leading edge 16 and trailing edge 14 of power pattern 15 are drawn in FIGURE 1A to intercept the terrain at points 9 and 10 respectively. Although the power pattern 15 appears uniform in FIGURE 1A, in actuality the power distribution is not uniform but has its highest energy ray in the center of the beam and decreases uniformly towards the edges. It is also assumed that the peak 18 in FIGURE 1A is an excellent reflector compared with the rest of the illuminated terrain and gives a so-called class 1 return.

Figure 3A:
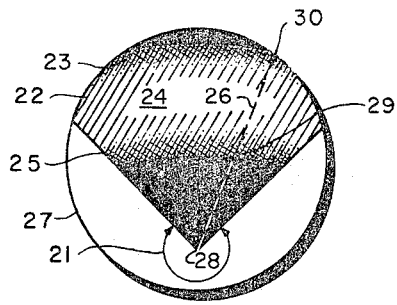
FIGURE 3A represents a view of the presentation on the simulated pilot's radar display corresponding to the situation in FIGURE 1A with the present invention.

The actual picture which the pilot would see on his radar display 27 would be similar to that shown in FIGURE 3A. It is assumed that the display is of the PPI type with radial time base. The included angle 21 swept by the radial scanning line 26 would correspond to the azimuth scan of antenna 12.

The peak 18 shown in FIGURE 1A produces the brightest spot 24 in the picture. The limits of the return 23 and 25 shown in FIGURE 3A corresponding to the leading edge 16 and trailing edge 14 of power pattern 15 are seen to decrease gradually from bright to dark in accordance with the actual power distribution of the beam.

Figure 1B:
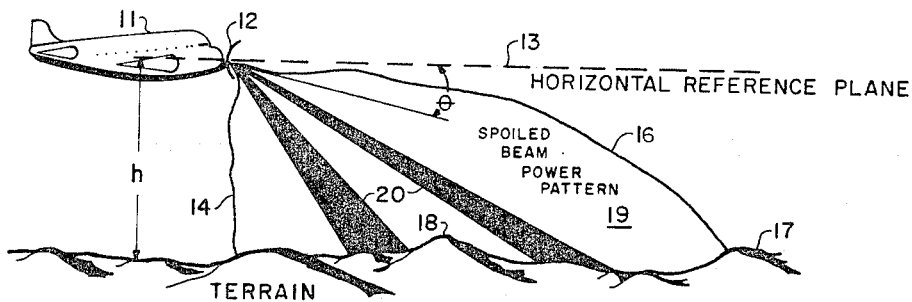
FIGURE 1B is an elevation view of an aircraft flying with the spoiled beam of its radar antenna directed toward the ground.

FIGURE 1B illustrates the same situation as in FIGURE 1A except that the so-called spoilers in the reflector, not shown, have been actuated to produce the broader spoiled beam 19. The spoilers and the radome enclosing the antenna produce discontinuities or holes 20 in the pattern. The same reference numbers are used in FIGURE 1B that correspond to similar characteristics shown in FIGURE 1A.

Figure 3B:
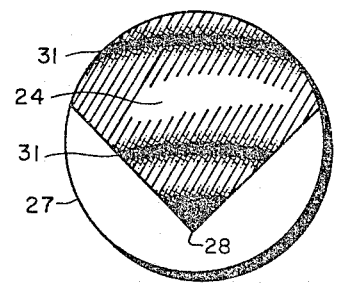
FIGURE 3B represents a view of the presentation on the simulated pilot's radar display corresponding to the situation in FIGURE 1B with the present invention.

The actual picture which the pilot would see on his radar display with a spoiled antenna beam would be similar to that shown in FIGURE 3B. The holes 20 in the spoiled beam power pattern 19 which contain minimum amounts of energy produce minimum return as shown by the dark areas 31 on the display 27 of FIGURE 3B. There is much greater coverage shown in FIGURE 3B. Also, it should be noted that the illuminated presentation of FIGURE 3B is of much more uniform brightness except for the class 1 return 24. This is because the spoilers distribute the energy more uniformly throughout the beam.

Figure 2:
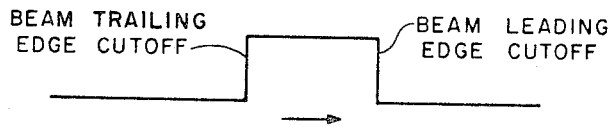
FIGURE 2 is a diagram of a typical gating pulse used in a conventional system to simulate a radar antenna pencil beam.
Figure 3C:
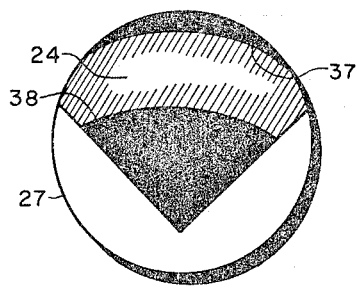
FIGURE 3C represents a view of a simulated presentation of situation in FIGURE 1A on a conventional radar simulator.

FIGURE 3C illustrates the presentation of the pencil beam situation shown in FIGURE 1A by present simulator means, where it is assumed that the terrain information has been stored in some convenient form such as tape or film. As noted previously, the on-off gating pulse shown in FIGURE 2, which modulates the information from the storage medium, results in the abrupt, well defined edges 37 and 38 bounding the radar return which is entirely unrealistic when compared with the actual picture shown in FIGURE 3A.

Figure 4:
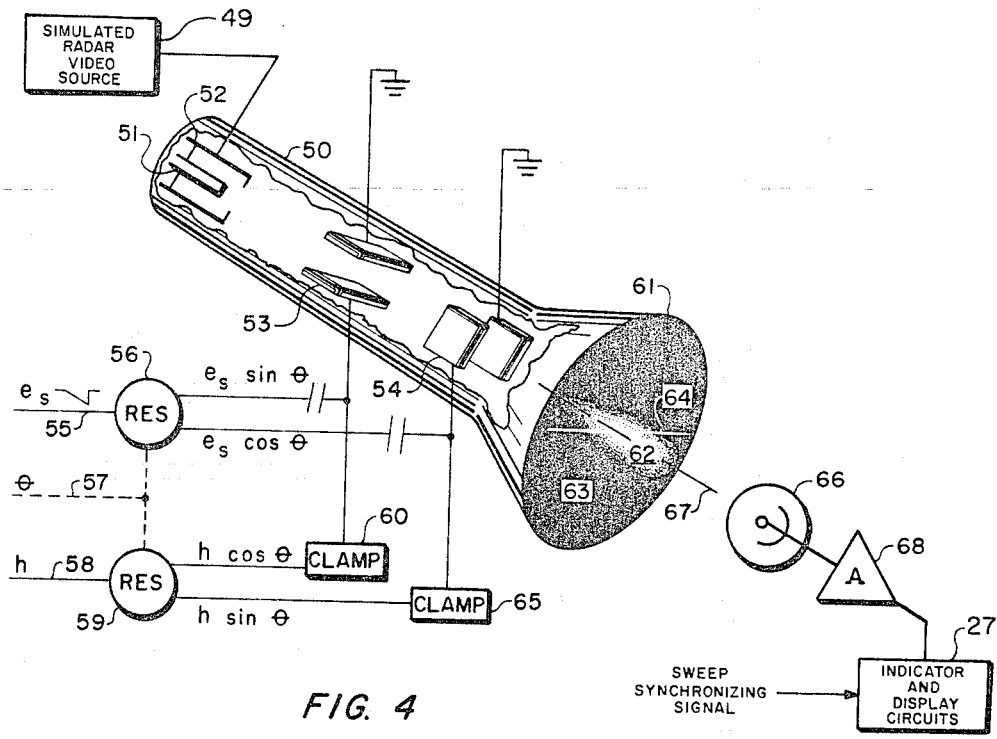
FIGURE 4 is an electrical block diagram of the radar simulation system of the present invention.

FIGURE 4 is an electrical block diagram of the radar simulation system of the present invention. A cathode ray tube 50 having a cathode 51, control grid 52, vertical deflection plates 53, and horizontal deflection plates 54 is shown with mask 63 affixed over the tube face 61. The output of a source 49 of simulated radar video signals is connected to the control grid 52.

Mask 63 has a central portion 62 representative of the pencil beam power pattern of antenna 12 positioned with its long central axis about a diameter of the tube face 67 normal to the horizontal deflection plates. The mask pattern is representative of the actual antenna power distribution by means of varying degrees of transparency of the mask from completely transparent at the center corresponding to the maximum gain at the center of the actual pattern to less and less transparency out from the long axis of the mask pattern, until the pattern becomes completely opaque at an orientation on the mask corresponding to the area in space surrounding the antenna beam where the antenna energy propagation ceases.

A suitable linear saw tooth time base $e_s$, synchronized with the radar simulator system time base, is introduced on winding 55 to resolver 56. A signal $h$, proportional to the altitude $h$ of the aircraft is introduced on winding 58 to resolver 59. The rotors 57 of resolvers 56 and 59 are coupled together and driven through an angle $\theta$ equal to the tilt angle $\theta$ of the antenna pencil beam with respect to the horizontal reference plane 13 shown in FIGURE 1A. The signals $h$ and $\theta$ come from the radar simulator's computer and may be introduced by the instructor. This resolves the output of resolver 56 into components $e_s \sin \theta$ and $e_s \cos \theta$ and the output of resolver 59 into components $h \sin \theta$ and $h \cos \theta$. The clamp 60 operates as any normal clamp, to provide the potential of the $e_s \sin \theta$ output of the resolver 56 with a datum which is the potential of the line to which it is clamped, in this case the $h \cos \theta$ line from the resolver 59. As the potential of the $h \cos \theta$ line may vary, the reference potential of the $e_s \sin \theta$ line also may vary. Thus, the clamp 60 effectively combines the effects of the two lines. The clamp 65 operates in the same manner to clamp the potential of the $e_s \cos \theta$ line to the potential of the $h \sin \theta$ line as a reference potential. The sum of the $e_s \sin \theta$ and $h \cos \theta$ voltages is connected to the vertical deflection plates 53, and the sum of the $e_s \cos \theta$ and $h \sin \theta$ voltages is connected to the horizontal deflection plates 54.

Figure 5:
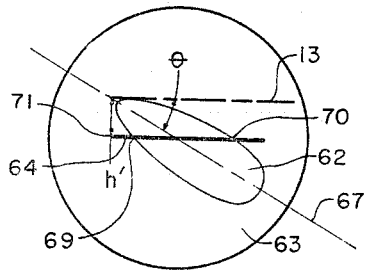
FIGURE 5 is a plan view of the mask used on the face of the cathode ray tube of FIGURE 4 without shading for purposes of illustration.

Referring to FIGURE 5, which represents the mask 63 without the shading for purposes of clarity, to illustrate the geometry of the mask relative to the scanning orientation 64, it shows the outline of the mask beam pattern where the energy distribution effectively falls off to zero. FIGURE 3A will now be considered to represent the face of the simulated pilot's indicator 27 for purposes of explanation.

The stored video echo information representative of the target 17 is picked up by a suitable light sensitive device such as a vidicon, shown in FIG. 4 as block 49, and the output of the device 49 is fed into control grid 52 of cathode ray tube 50 to intensify the trace with increased return. It could also be applied to any other intensifying electrode such as cathode 51. The video information from the source 49 is updated at a rate corresponding to the simulated antenna scan rate and the velocity of the simulated aircraft 11 since the radar return generator is synchronized with the simulated radar. CRT scanning signal $e_s$ on resolver input 55 of FIGURE 4 and the radial time base of the simulated pilot's indicator 27 of FIGURE 3A are also synchronized with the radar, so the respective electron beams initiate their scanning simultaneously, at point 71 relative to the mask 63 as reproduced in FIGURE 5 and at point 28 on pilot's indicator 27. This corresponds to the time that a pulse of energy is radiated from antenna 12 towards the ground.

As the intensified electron beam scans along trace 64, the video information does not get through the opaque portion of mask 63, so no illumination falls on photocell 66 and the trace 26 on pilot's indicator 27 remains dark. At the point 69 on trace 64, the trace first makes contact with the mask representation of the antenna pattern 15. The time required for the electron beam spot to travel from point 71 to point 69 on trace 64 represents the two-way travel time of the energy in the trailing edge of pencil beam 15 transmitted to and reflected from point 10 on the target 17 of FIGURE 1A. At the point 69 in FIGURE 5, the mask starts to become transparent to the point that a small portion of the light energy in the intensified trace representing video information on the control grid 52 of CRT 50 passes through the mask and impinges on photocell 66. Photocell 66 outputs are applied through amplifier 68 to the display circuits of pilot's indicator 27 to intensify the radial trace 26 at the point 29. This corresponds to the return from point 10 of FIGURE 1A which is relatively faint as the power distribution in pencil beam 15 tapers down to a very low value at the edges. It should be noted that the phosphor used on the CRT screen must have a very rapid decay time, so that the photocell does not integrate the trace. The mask representation 62 of the power pattern 15 is most transparent along the axis 67 to correspond to the maximum strength at the central ray of pencil beam 15. Hence when the spot reaches the center of pattern 62, the video signal on control grid 52 is transferred to photocell 66 and the display circuits of pilot's indicator 27, unattenuated to intensify the radial trace 26. As the electron beam of CRT 50 proceeds further along the trace 64, the mask becomes less and less transparent, and less and less of the video signal gets through to photocell 66, until at point 70 on the trace 64 of CRT 50, the mask becomes opaque again, and the radial trace 26 goes dark at point 30. As the antenna 12 scans in azimuth the cycle repeats and another radial scanning line 26 spaced at an angle corresponding to the new azimuth location of antenna 12 proceeds out radially on pilot's indicator 27 of FIGURE 3A. The peak 18 on the target 17 of FIGURE 1A is assumed to have greater reflectivity than the remainder of the target 17, i.e., it is a class 1 radar return. The storage medium would show this and the video input from the radar map pickup device on control grid 52 will intensify the trace accordingly, so that the representation on pilot's indicator 27 of FIGURE 3A shows an intense area of illumination 24 corresponding to the azimuth expanse of peak 18.

The analogy between FIGURE 5 and FIGURE 1A produces the desired and realistic simulation of the radar scope presentation in an actual airborne radar system. The central axis of the mask representation 62 of the pencil beam power pattern is positioned along an axis 67 normal to the horizontal deflection plates 54 and halfway between the vertical deflection plates 53, so that with zero signal on the vertical deflection plates and a sawtooth timing base on the horizontal deflection plates, the electron beam will move along the central axis. However, with the signals resolved as shown in FIGURE 4, so that a signal $e_s \sin \theta + h \cos \theta$ is applied to the vertical deflection plates and a signal $e_s \cos \theta + h \sin \theta$ is applied to the horizontal deflection plates, the scan is rotated through an angle $\theta$ from the normal sawtooth time base direction and displaced from the origin of the scan $e_s$ by a constant distance $h'$ corresponding to the voltage $h$ on resolver input 58. As a result the trace now scans along line 64. In order to produce the most realistic simulation of the radar return, the distance $h'$ on FIGURE 5 should be proportioned to the magnitude of the pattern representation 62 so that the trace 64 cutting across the pattern representation 62 bears the same geometrical proportions as the target 17 cutting across the pencil beam power pattern 15 in FIGURE 1A. This requires the altitude voltage signal $h$ fed into resolver input 58 to be proportional to the maximum value of the sawtooth signal $e_s$ so that the pattern representation 62 is crossed at the proper location. This is computed with due regard for the system characteristics and the simulated flight parameters in the system computer. With the proper geometrical proportions, and the relative transparency, ray by ray from its apex over the entire pattern representation 62 proportional to the relative power distribution, ray by ray from the antenna over the pencil beam 15, the video input on control grid 52 of CRT 50 will be modulated by the transparency of the mask pattern 62 just as the reflectivity of the target 17 is modulated by the power distribution in the pencil beam power pattern 15. The modulated video signal is then applied to the simulated pilot's indicator 27 of FIGURE 3A to produce the realistic radar picture of the target over which the aircraft is flying.

Figure 6:
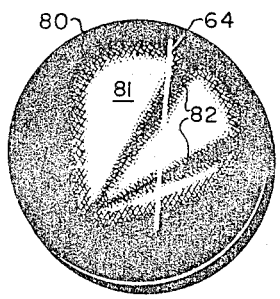
FIGURE 6 is a plan view of the mask used for simulating the spoiled beam antenna pattern shown in FIGURE 1B.

FIGURE 1B illustrates how the spoilers in the antenna dish spread out the pattern and the dead spots or holes in the pattern produced by the radome and the spoilers and associated interferences. The only change required to the simulation system described above is the substitution of a new mask 80 for the spoiled beam 19, in which the mask transparency is representative of the power distribution in the beam, including the holes which in the mask pattern would be opaque. FIGURE 6 shows the mask representation 81 of the spoiled beam corresponding to the actual spoiled beam 19 of FIGURE 1B. Opaque rays 82 in the mask representation 81 correspond to the actual holes 20 in the spoiled beam 19. As the electron beam spot proceeds along trace 64 the video is modulated by the density of the pattern 81 to produce the picture shown in FIGURE 3B in which holes 31 correspond to the opaque portions 82 of FIGURE 6.

Various methods can be used to produce the mask such as painting grey shades with an air brush or by photographic techniques using controlled exposure times for a piece of fine grained film. One technique that provided particularly satisfactory was to construct a reverse three dimensional model of ordinary modeling clay in the form of the mask representation of the power pattern with the thicker dimensions corresponding to the areas where more transparency was desired and the thinner dimensions corresponding to the more opaque portions of the mask. The model was then placed over a film strip and a number of X-ray exposures made through the model to develop the required image for the mask. The film area under the thicker portions of the model were then exposed less and were more transparent than the film areas under the thinner portions of the model.

It was found that a 5ADP16 cathode ray tube which has a flat face produced minimum parallax problems when the mask was placed over the tube face. This tube has a rapid response characteristic suitable for the system band width with its P16 phosphor in which the light intensity decays to 10 percent of its maximum intensity in 0.1 micro second. An RCA 1P21 photo multiplier tube was used for the photocell as it matches the spectral image of a P16 CRT phosphor. This combination gives band widths exceeding 10 megacycles.

It should be understood that only embodiments of the present invention have been described using specific terms and examples, but using them in a generic and descriptive sense and not for purposes of limitation, as the scope of the invention is set forth in the following claims:

What is claimed is:
1. Radar simulation equipment comprising:
 (a) a cathode ray tube for producing an electron beam trace and having deflection means, intensifying means, and a tube face;
 (b) a mask, positioned over the tube face, and having an opaque portion and a transparent portion with varying degrees of transparency, representative of an antenna power pattern relative to a horizontal reference plane;
 (c) means for supplying a linear time base signal synchronized with the simulated radar;
 (d) means for supplying an antenna altitude signal;
 (e) means for supplying an antenna pattern tilt signal relative to the reference plane;
 (f) resolving means connected to the deflection means for resolving said three signals to deflect the electron beam trace across the tube face parallel to the reference plane but below said plane a distance proportional to the antenna altitude;
 (g) means for providing a simulated radar return signal connected to modulate the intensifying means with change in return signal;
 (h) photosensitive means for yielding an output signal proportional to the light transmitted by the beam trace through the transparent antenna pattern position of the mask, and (i) indicator means having display circuits synchronized with the simulated radar and connected to receive the photosensitive means output and display a representation of a radar echo when the cathode ray tube trace crosses the transparent pattern portion of the mask but to remain blank corresponding to the radar travel time when said tube trace crosses the opaque portion of said mask.

2. A student trainer for simulating the effect of the antenna beam on the radar display in an airborne radar system, said trainer comprising:

(a) a source of simulated radar video information for supplying first video signals;

(b) a cathode ray tube for producing an electron beam and having orthogonal deflection means; intensifying means responsive to the first video signals for intensifying the electron beam with increased video potential; and a fast decaying tube screen;

(c) masking means having a light transmissive portion representing a scale pattern of the antenna beam, said pattern having varying degrees of light transmissivity corresponding to varying power density in corresponding portions of the beam and also having an opaque portion around the scale pattern, said masking means being positioned adjacent to the tube screen with the pattern referenced to one of the orthogonal directions of the deflection means;

(d) means for generating a first sweep signal synchronized with the radar system; means for generating an antenna altitude signal; and means for generating an antenna beam tilt signal $\theta$;

(e) resolving means connected to the deflection means; means for applying to said resolving means said first sweep signal and said antenna altitude and antenna beam tilt signals to cause said sweep signal to rotate through an angle $\theta$ from the reference direction and to displace said sweep signal origin by a distance corresponding to the antenna altitude on said pattern scale;

(f) photosensitive means responsive to the attenuated first video signals transmitted through the masking means antenna pattern for producing second video signals representative of the reflectivity of said radar information modulated by the antenna beam power distribution;

(g) and radar display means having means for generating a second sweep signal synchronized with the first sweep signal and second intensifying means for receiving and displaying the second video signals.

References Cited by the Examiner

UNITED STATES PATENTS

| | | | |
|---|---|---|---|
| 2,494,566 | 1/1950 | Linderman | 250—234 X |
| 2,540,943 | 2/1951 | Hales | 250—217 |
| 2,711,479 | 6/1955 | Lewinter | 250—217 |
| 2,740,205 | 4/1956 | Shamis et al. | 35—10.4 |

FOREIGN PATENTS

| | | |
|---|---|---|
| 561,298 | 8/1958 | Canada. |
| 805,293 | 12/1958 | Great Britain. |

CHESTER L. JUSTUS, *Primary Examiner.*

MAYNARD R. WILBUR, RODNEY D. BENNETT,
*Examiners.*

T. H. TUBBESING, *Assistant Examiner.*